Sept. 6, 1966  J. L. COCKRELL  3,271,690
PUSH-PULL FULL-WAVE MAGNETIC AMPLIFIER
Filed Feb. 13, 1963

United States Patent Office 3,271,690
Patented Sept. 6, 1966

3,271,690
PUSH-PULL FULL-WAVE MAGNETIC AMPLIFIER
James L. Cockrell, Ann Arbor, Mich., assignor to Leeds and Northrup Company, Philadelphia, Pa., a corporation of Pennsylvania
Filed Feb. 13, 1963, Ser. No. 258,267
5 Claims. (Cl. 330—8)

This invention relates to push-pull full-wave magnetic amplifiers and particularly to circuit arrangements for resetting the saturable cores of such amplifiers.

In general, the core-resetting circuits heretofore used have been quite complex, requiring for example separate bias coils for the individual cores and/or symmetrical reset paths with resistors shunting the associated diodes, and have such disadvantages as low-gain due to degeneration, limited range of the core-switching frequency, and errors due to "zero" drift.

In accordance with the present invention, resetting of two pairs of cores is accomplished by using a single resistance means interconnecting the output windings of one core of each of the two pairs, and by using an input signal winding inductively coupled to all cores so providing a core-reset circuit which is not only simple but which also affords full amplifier gain free of bias circuit degeneration, which has a wide range of switching frequency, and which is essentially free of "zero" errors.

More particularly, the single resistance means is so connected between the two halves of the push-pull full-wave arrangement of cores and associated diodes that for each successive half-wave of the core-switching frequency, both cores of one pair are driven from the switching source to produce an output signal; one core of the other pair is reset through the resistance means by current from the switching source; and the other core of the other pair is reset by current induced in the common signal-input winding.

The invention further resides in new and useful features of combination and arrangement hereinafter described and claimed.

Figure 1:
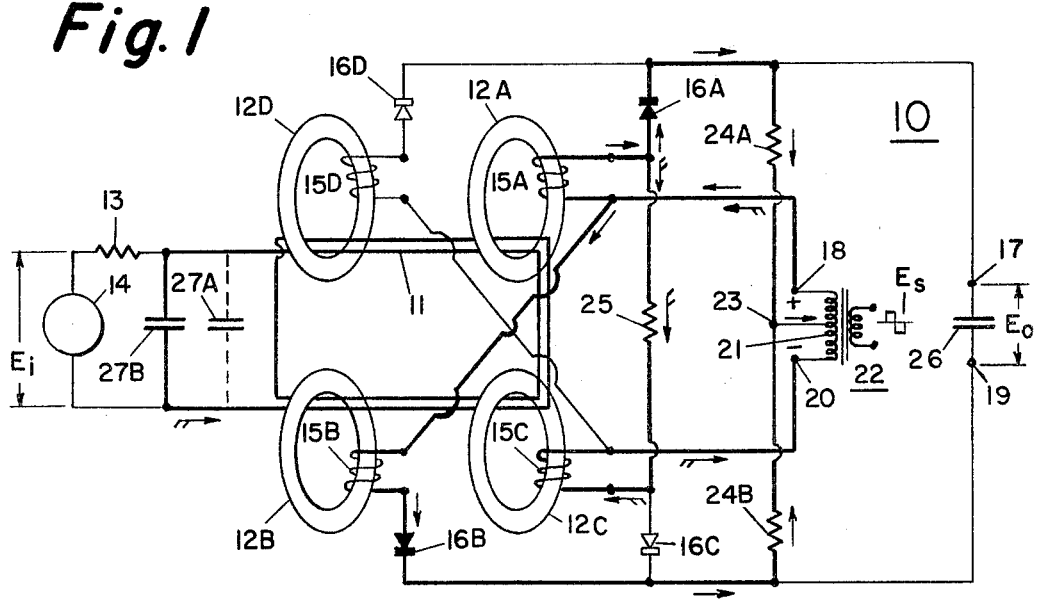
Figure 2:
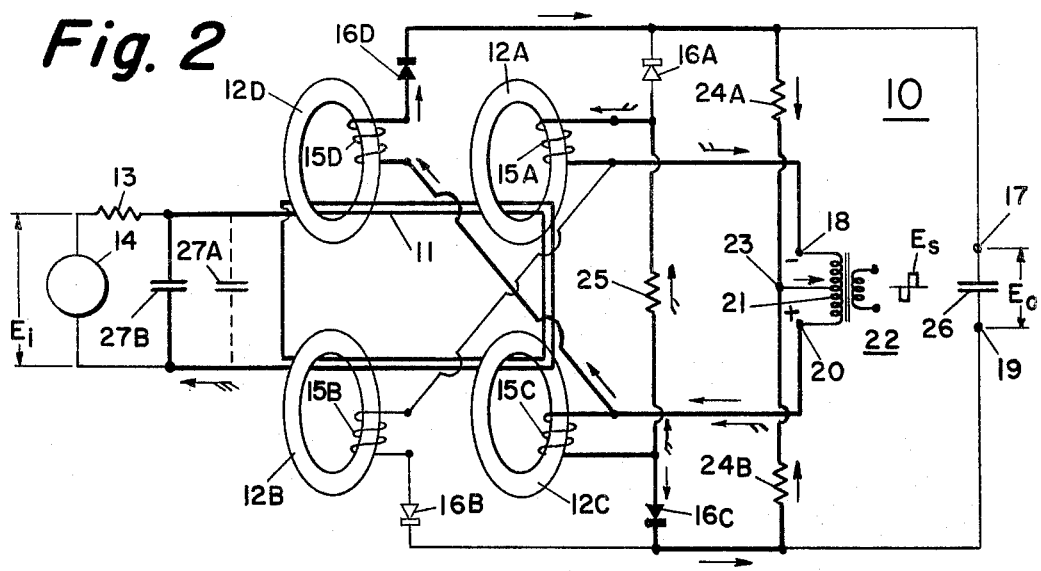

For a more detailed understanding of the invention, reference is made in the following description of a preferred embodiment thereof to the accompanying drawings in which:

FIG. 1 is a schematic of a push-pull full-wave magnetic amplifier indicating by heavy lines and different types of arrows the paths of gating and reset current existent for switching pulses of one polarity; and FIG. 2 is similar to FIG. 1 but for switching pulses of the other polarity.

A push-pull full-wave magnetic amplifier 10 embodying the present invention is shown in FIGS. 1 and 2. The input or signal winding 11 is coupled to all four of the saturable cores 12A–12D and is connected, preferably or usually through a resistor 13, to the source 14 of signal voltage $E_i$. In general, the source 14 may be any circuit or device for producing a D.C. voltage or current representative of a condition under measurement; for example, it may be a temperature-responsive thermocouple which supplies a D.C. current of fixed polarity and of magnitude representative of temperature; it may be an ion chamber whose output current pulses are of unidirectional polarity and of magnitude proportional to radiation level or nuclear activity level; or it may be a balanceable measuring network such as a bridge or potentiometer supplying a D.C. signal of polarity dependent upon the sense of unbalance and of magnitude representing the magnitude, or change in magnitude, of a measured variable.

The output winding 15A of core 12A is connected in series with the rectifier or diode 16A between the output terminal 17 of the amplifier and the terminal 18 of a source of switching voltage $E_S$. The output winding 15B of core 12B is connected in series with the diode 16B between the output terminal 19 of the amplifier and the terminal 18 of the switching-voltage source. Specifically, terminals 18 and 20 may be the end terminals of the secondary winding 21 of transformer 22 energized from any suitable source, for example, a square-wave pulse generator. The intermediate or center-tap terminal 23 of source $E_S$ is connected via mixing resistors 24A, 24B respectively to the amplifier output terminals 17, 19 to which an amplifier load is connected. This pair of cores 12A, 12B and diodes 16A, 16B forms one-half of the full-wave arrangement and with the cores inductively coupled in push-pull relation by the winding 11 to the signal source 14.

The output winding 15C of core 12C is connected in series with rectifier 16C between the output terminal 19 of the amplifier and the swtiching-voltage terminal 20. The output winding 15D of core 12D is connected in series with the rectifier 16D between output terminal 17 of the amplifier and the switching-voltage terminal 20. The cores 12C, 12D of this second pair are inductively coupled in push-pull relation by winding 11 to the input signal source 14; with the associated pair of rectifiers 16C–16D, they form the other half of the full-wave rectifier system of the amplifier 10.

With the circuit as thus far described and assuming a given polarity of input signal $E_i$, when the switching-voltage terminal 18 is positive with respect to the center-tap 23 (FIG. 1), the output windings 15A and 15B of the first pair of cores 12A, 12B drive these cores to saturation in one sense from a preset flux level, the extent of change of flux level of one of the cores depending upon the magnitude of the input signal; and when the switching-voltage terminal 20 is positive with respect to the center-tap 23 (FIG. 2), the output windings 15C and 15D of the second pair of cores 12C, 12D drive them to saturation in one sense from a preset flux level, the extent of change of flux level of one of the cores depending upon the magnitude of the input signal. This setting or gating of the cores is the same as with conventional push-pull full-wave magnetic amplifiers.

As will appear from further description of FIGS. 1 and 2, the resetting of the cores of both pairs back to their original respective flux levels is accomplished by addition of a single resistor 25 to the circuitry previously described. Advantages of this arrangement are elimination of separate bias coils for the cores, absence of degeneration, and substantial elimination of "zero" drift due to temperature or tolerance variations. For purposes of explanation, it will be considered that for positive half-waves of the switching-voltage $E_S$, the terminal 18 is positive (FIG. 1) and that for negative half-waves of the switching-voltage, the terminal 20 is positive (FIG. 2).

First considering the events occurring for a positive half-wave of switching-voltage $E_S$, reference is made to FIG. 1. The path of the gating pulse (unfeathered arrows) for core 12A may be traced from end terminal 18, through output coil 15A, diode 16A and mixing resistor 24A back to the intermediate terminal 23. The path of the gating pulse for core 12B may be traced from end terminal 18, through output coil 15B, diode 16B and mixing resistor 24B back to the intermediate terminal 23. Except when the input signal $E_i$ is of zero magnitude, the net or differential voltage $E_0$ across the mixing resistors 24A, 24B is of finite value and effective to produce flow of current through any load connected between output terminals 17, 19 of the amplifier. In sense, the output signal corresponds with the sense of the applied input signal. The magnitude of the output signal differs from that of the input signal by a factor equal to the normal gain of the amplifier: i.e., there is no reduction of gain by negative feedback.

Also for a positive half-wave of the switching-voltage $E_S$, a small magnetizing pulse (feathered arrow) for resetting the core 12C flows in a path which may be traced from terminal 18, through output winding 15A, resistor 25, output winding 15C of core 12C back to the terminal 20. The value of resistor 25 is so selected for the current/magnetic characteristic of a particular core that it permits a magnetizing current sufficiently large to reset the core 12C approximately half-way to saturation in its opposite sense.

Also during a positive half-wave of the switching-voltage $E_S$, the core 12D is reset by a magnetizing current pulse induced in winding 11 in the signal input circuit. This induced reset pulse for core 12D is the net voltage effect of the gating pulses for the pair of push-pull cores 12A–12B and the resetting pulse for core 12C, all of the latter being derived by direct coupling to the source of switching voltage. For lower switching frequencies, the distributed capacitance 27A of the common coupling coil 11 may be supplemented by an external capacitance 27B to provide a loop circuit of suitably low impedance for effective resetting of core 12D by magnetic induction: such external capacitance may not be necessary for the higher switching frequencies or for low impedance sources of the input signal. For high impedance signal sources, the capacitance 27A, 27B and resistor 13 provide an isolating filter section. Core-switching frequencies from 5 kc. to 100 kc. have proved to be suitable and without indication that higher or lower switching frequencies would adversely affect operation of this amplifier circuitry.

In brief résumé of the events occurring during each positive half-wave of the switching-voltage, the cores 12A, 12B of one push-pull pair are driven or set by the switching pulse to produce across the amplifier output terminals 17, 19 a voltage $E_0$ corresponding with the existing input voltage $E_i$ times the normal amplifier gain; the core 12C of the second pair of push-pull cores is reset by direct coupling through resistor 25 to the source of switching voltage; and the core 12D of the second pair of push-pull cores is reset by its inductive coupling to the input loop circuit common to all cores. The diodes 16C, 16D are not conductive for this half-cycle of the switching-voltage.

Similarly, during each negative half-wave of the switching-voltage (FIG. 2), the cores 12C, 12D of the second pair of push-pull cores are set or driven from the switching-voltage source to produce across the amplifier output terminals 17, 19, a voltage $E_0$ corresponding with the existing input voltage $E_i$ times the normal amplifier gain and of the same polarity as produced for the positive half-waves of the switching-voltage; the core 12A of the first pair of push-pull cores is reset by direct coupling through the same resistor 25 to the source of switching-voltage; and core 12B of the first pair is reset by its inductive coupling to the input loop circuit common to all cores. The rectifiers 16A, 16B do not conduct for this half-cycle of the switching-voltage.

More specifically, the path of the gating pulse current (unfeathered arrows) for core 12C may be traced from terminal 20 (FIG. 2) through the output coil 15C of core 12C, rectifier 16C, and mixing resistor 24B back to the intermediate terminal 23. The path for the gating current for the other core 12D of this pair may be traced from terminal 20 through the output coil 15D of core 12D, rectifier 16D, and mixing resistor 24A back to the intermediate terminal 23 of the switching-voltage source. The path for the resetting pulse (feathered arrows) for core 12A may be traced from terminal 20 through output winding 15C of core 12C, resistor 25, and output winding 15A of core 12A back to the terminal 18 of source $E_S$. The core 12B of the pair 12A–12B is reset by the pulse (feathered arrow) induced in the loop circuit 11, 27A, 27B during the gating of the push-pull cores 12C–12D and the resetting of core 12A.

It shall be understood the invention comprehends not only the circuit specifically illustrated and described but also modifications and equivalents thereof within the scope of the appended claims.

What is claimed is:

1. A push-pull full-wave magnetic amplifier including two pairs of saturable cores each having an output winding and a source of switching pulses of alternately opposite polarity characterized in that the cores of each pair are inductively coupled in push-pull relation by an input-signal winding common to all cores, and that a coupling resistance means is connected between the output windings of one of the cores of each of said pairs to provide a series-circuit across said source for alternate resetting of said one core of each of the two pairs by current from said source, the other core of each of the two pairs being reset by current induced in said input-signal winding common to all cores in consequence of the current-flow through said series-circuit from said source.

2. A push-pull full-wave magnetic amplifier comprising two pairs of saturable cores each having an output winding, a signal-input winding inductively coupled in push-pull relation to the two cores of each pair thereof, a source of switching pulses of alternating polarity, a full-wave rectifier circuit connected to said output windings and to said source for production of an amplified output signal, and a resistor connected in series-circuit with said source between an output winding of one of said pair of cores and the corresponding output winding of the other pair of cores alternately to reset each pair of cores while the other pair of cores is being gated, the resetting of one core of each pair being by current flowing directly from said source through said resistor and said output windings in series therewith and the resetting of the other core of each pair being by current induced in said signal-input winding in consequence of the current-flow from said source through the aforesaid series-circuit.

3. A push-pull full-wave magnetic amplifier comprising two pairs of saturable cores each having an output winding, a signal-input winding inductively coupled in push-pull relation to the two cores of each pair thereof, a source of switching pulses of alternately opposite polarity, a rectifier circuit interconnecting said output windings, said source and said output circuit for production of an amplifier output signal, and a resistor connecting the output windings of one core of each of said pairs in series-circuit with said source, independently of said rectifier circuit, whereby said source is effective alternately to reset said cores by current pulses of alternately opposite polarity from said source, the other cores of each of said pairs being alternately reset by current pulses induced in said signal-input winding in consequence of the flow of current pulses from said source through said resistor and the two output windings in series therewith.

4. A push-pull full-wave magnetic amplifier comprising two pairs of saturable cores each having an output winding, an input winding inductively coupled in push-pull relation to the two cores of each pair, a mixing circuit connected across the output terminals of the amplifier and having an intermediate terminal, a source of core-switching pulses having an intermediate terminal connected to said intermediate terminal of said mixing circuit, an end terminal of one instantaneous polarity connected to the common terminal of the output windings for one pair of cores, and an end terminal of opposite instantaneous polarity connected to the common terminal of the output windings for the other pair of cores, a full-wave rectifier including two pairs of diodes, the diodes of each pair connecting the output coils of a corresponding pair of cores to opposite end terminals of said mixing circuit, and resistance means connecting the two output windings of two cores of different pairs in series across the end terminals of said source so to provide for alternate resetting of said cores by current pulses from said source, the other two cores of the different pairs being alternately reset by current pulses induced in said input winding common to all cores in consequence of the flow of current pulses from said source through said resistance means and said two output windings in series therewith.

5. A push-pull full-wave magnetic amplifier comprising two pairs of saturable cores each having an output winding, a signal-input circuit comprising an input winding inductively coupled in push-pull relation to the two cores of each pair of cores, a center-tapped alternating-current source, one end terminal of said source being connected to the common terminal of the output windings of the first pair of said cores, and the other end terminal of said source being connected to the common terminal of the output windings of the second pair of said cores, a first pair of diodes each connected from the other terminal of each output winding of said first pair of cores to the center-tap of said source through a mixing resistance means, a second pair of diodes each connected from the other terminal of each output winding of said second pair of cores to the center-tap of said source through a mixing resistance means, and resistance means connecting the two output windings of two cores of different pairs in series across the end terminals of said source so to provide for alternate resetting of said cores by magnetizing current pulses from said source, the other two cores of the different pairs being alternately reset by magnetizing current pulses induced in said input winding common to all cores in consequence of the flow of current pulses from said source through said resistance means and said two output windings in series therewith.

References Cited by the Examiner

UNITED STATES PATENTS

| | | | |
|---|---|---|---|
| 2,872,533 | 2/1959 | Hubbard | 330—8 X |
| 2,954,519 | 9/1960 | House | 330—8 X |
| 2,961,599 | 11/1960 | Geyger | 330—8 X |

ROY LAKE, *Primary Examiner.*

N. KAUFMAN, *Assistant Examiner.*